United States Patent [19]

Steinberg

[11] Patent Number: 4,755,241

[45] Date of Patent: Jul. 5, 1988

[54] CABLE SEALING

[75] Inventor: Norman R. Steinberg, Munich, Fed. Rep. of Germany

[73] Assignee: Raychem GmbH, Fed. Rep. of Germany

[21] Appl. No.: 23,935

[22] Filed: Mar. 6, 1987

Related U.S. Application Data

[63] Continuation of Ser. No. 902,115, Aug. 29, 1986, abandoned, which is a continuation of Ser. No. 644,821, Oct. 29, 1984, abandoned, which is a continuation of Ser. No. 365,086, Apr. 2, 1982, Pat. No. 4,485,269.

[30] Foreign Application Priority Data

Apr. 7, 1981 [GB] United Kingdom ............... 8112013

[51] Int. Cl.$^4$ ........................................... H01B 13/32
[52] U.S. Cl. ....................................... 156/48; 156/49; 156/86; 174/71 R; 174/73 R; 174/84 R; 174/DIG. 8
[58] Field of Search ............................. 156/48, 49, 86; 174/71 R, 73 R, 84 R, DIG. 8; 428/379

[56] References Cited

U.S. PATENT DOCUMENTS

| 3,017,306 | 1/1962 | Priaroggia | 174/84 R |
| 3,187,088 | 6/1965 | Warner | 174/84 R |
| 3,356,788 | 12/1967 | Callahan et al. | 174/73 R |
| 3,539,411 | 11/1970 | Heslop et al. | 156/86 |
| 3,717,717 | 2/1973 | Cunningham et al. | 174/73 R |
| 4,311,871 | 1/1982 | Brunner et al. | 174/74 A |
| 4,378,463 | 3/1983 | Senior et al. | 174/73 R |
| 4,485,269 | 11/1984 | Steinberg | 174/84 R |
| 4,586,970 | 5/1986 | Ishise et al. | 156/48 |

FOREIGN PATENT DOCUMENTS

| 2601545 | 7/1977 | Fed. Rep. of Germany . |
| 2606441 | 8/1977 | Fed. Rep. of Germany . |
| 1526397 | 9/1978 | United Kingdom . |
| 2022331 | 12/1979 | United Kingdom . |
| 2036460 | 6/1980 | United Kingdom . |

Primary Examiner—Robert A. Dawson
Attorney, Agent, or Firm—Edith A. Rice; Herbert G. Burkard

[57] ABSTRACT

A joint between a mass-impregnated paper insulated cable and a plastic insulated cable is sealed to contain the mass impregnating, oil material by applying a heat-recoverable oil resistant tubing over the exposed paper insulation so as to leave a portion thereof uncovered adjacent the exposed conductor of the cable, applying an oil resistant mastic to said uncovered portion of the insulation and over an adjacent end of said tubing, and applying a further heat-recoverable tubing over the mastic and an adjacent portion of the oil resistant tubing.

14 Claims, 3 Drawing Sheets

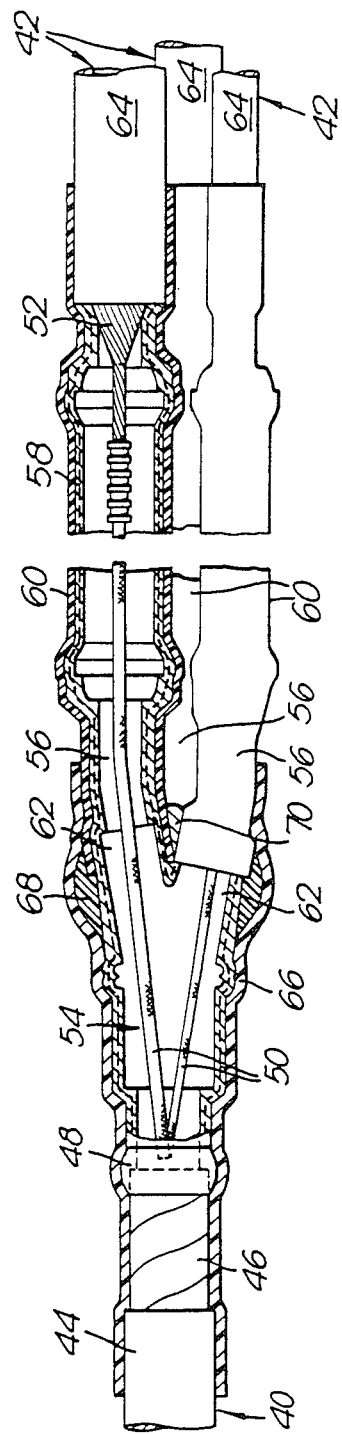

CABLE SEALING

This application is a continuation of application Ser. No. 902,115, filed Aug. 29, 1986, now abnadoned, which in turn is a continuation of applicaiton Ser. No. 644,821, filed Oct. 29, 1984, now abandoned, which in turn is a continuation of application Ser. No. 365,086, filed Apr. 2, 1982 which is now U.S. Pat. No. 4,485,269.

DESCRIPTION

This invention relates to cable sealing, and is particulary concerned with sealing the end of a mass-impregnated paper insulated cable, at a joint or termination. The invention finds particular, though not exclusive, application in a transition joint between a mass-impregnated (MI) paper insulated cable and a plastic insulated cable, for example, in the medium voltage range of 12 to 17.5 KV.

Plastic, usually cross-linked polyolefin, for example polyethylene, cable is being used more and more throughout the world, and problems have arisen in jointing this to existing mass-impregnated paper cable because of the difficulty in satisfactorily sealing the mass-impregnating material. Such material comprises blends of synthetic hydrocarbon resins and mineral oils, usually incorporating natural resin. For convenience elsewhere herein, such material will be referred to as "oil". The viscosity of this material typically is around 10,000 mm$^2$/sec (kinematic viscosity) at room temperature and decreases to around 200 mm$^2$/sec at the maximum operating temperature of the cable, polyethylene to deteriorate, causing it to soften and swell, and that an oil-resistant barrier must be provided to protect such material.

Some cross-linked polyolefin electrically insulating materials, however, have good oil resistance, and have been used very successfully for some years in the form of recoverable, for example heat-recoverable, tubing and breakouts in low-voltage (i.e. around 1 kV) MI/plastic cable transition joints and low voltage MI cable terminations. Such components are commercially available from Raychem. At higher voltages such materials are still applicable, but higher voltage joints or terminations may require conductive and semi-conductive materials to ensure proper electrical integrity, for example to provide stress-control. Conductive polymers are widely used in many types of plastic cable and accessories for electrical field control and screening purposes. However, conductive polymers are heavily loaded with carbon and are very susceptible to oil uptake, drastically increasing their resistance. The resultant loss of electric field control can lead to surface discharge and, ultimately, complete electrical breakdown of the cable accessory or of the cable itself. Thus, where conductive polymers are used in connection with MI cable, it is even more important to provide an oil barrier.

It is an object of the present invention to provide an improved method of sealing the mass-impregnating material of an MI cable at an end thereof, to facilitate its jointing to a plastic cable or its termination, for example.

In accordance with one aspect of the present invention, there is provided a method of sealing an end of a mass-impregnated paper insulated cable, the cable end being stripped to expose a conductor thereof and to expose a length of the overlying mass-impregnated paper insulation, the method comprising enclosing said exposed insulation within a recovered first polymeric member that is substantially unaffected (as herein defined) by the mass-impregnating material of the cable so as to leave exposed a portion of said length of insulation adjacent said exposed conductor, applying a sealant material, which is substantially unaffected by the mass-impregnating material of the cable, over said exposed portion of the cable insulation, and over an adjacent end region of said first polymeric member, and recovering a second polymeric member over said sealant material and an adjacent portion of said first polymeric member.

As herein used, "recoverable" refers to a property of an article whereby its configuration, for example its dimensions, may be made to change substantially when subjected to an appropriate treatment. The article may be, for example, heat recoverable such that its configuration changes when it is subjected to a heat treatment. Heat-recoverable articles may be produced by deforming an article from a dimensionally heat stable configuration to a dimensionally heat unstable configuration, in which case the article will assume, or tend to assume, the original heat stable configuration on the application of heat alone. According to one method of producing a heat recoverable article, a polymeric material is first extruded or moulded into a desired shape. The polymeric material is then cross-linked or given the properties of a cross-linked material by exposure to high energy radiation for example a high energy electron beam or gamma radiation. The crosslinked polymeric material is heated and deformed, and then locked in the deformed condition by quenching or other suitable cooling means. The deformed material will retain its shape almost indefinitely until exposed to a temperature above its crystalline melting temperature, for example about 120° C. in the case of polyethylene. Examples of heat-recoverable articles may be found in U.S. Pat. No. 2,027,962 and in U.K. Patent specification No. 990,235, the disclosures of which are incorporated herein by reference. As is made clear in U.S. Pat. No. 2,027,962, however, the original dimensionally stable heat-stable configuration may be a transient form in a continuous process in which, for example an extruded tube is expanded, whilst hot, to a dimensionally heat unstable form.

The term "substantially unaffected" as used herein with reference to polymeric members or sealant material is to be understood to mean that the mass-impregnating material of the cable has no effect thereon that appreciably changes the electrical or mechanical properties thereof. A member or material that is so substantially unaffected is also herein referred to as "oil resistant".

It has been found, very surprisingly, that the most efficient sealing of such a cable end is achieved by recovering the second polymeric member not only over the overlap between the sealant material and the first polymeric member but also directly on to an adjacent portion of the first polymeric member, thereby to provide a direct seal between the two polymers, preferably of between about 19 mm and about 40 mm. On the other hand, and contrary to expectation, the sealing of the mass impregnating material has been found to be quite unsatisfactory (a) when no sealant material is used at the edge of the first polymeric member, since surface imperfections in the overlying polymer surfaces could give rise to leakage paths, and (b) when sealant material is provided over the whole of the overlap between the two polymeric members, cohesive failure then being experienced.

The sealing thus provided retains the impregnating material of the paper insulated cable so that other components, that are adversely affected by the impregnating material, and in particular components made of conducting or semiconducting polymeric materials, may subsequently be safely applied to the cable.

It will be appreciated that since the second polymeric member is separated from the mass-impregnated paper insulation by the first polymeric member and/or the sealant material, it may be made from any material chosen for its electrical or other properties without having to ensure that it is unaffected by the mass-impregnating material. In particular, it may be made from a material that is electrically conductive or semi-conductive, if the voltage rating of the cable so requires, for example.

In a cable joint or termination that requires an electrically conductive or semi-conductive layer to extend around the cable insulation away from the exposed conductor, this may be provided to overlap the said first polymeric member, to be sealed thereto at its free edge by oil-resistant sealant material, for example the said sealant material, and said second polymeric member may be arranged to overlap the said edge. Conveniently, this layer may be provided by a third recoverable member. In such arrangements, it has been found advantageous to have a surface-to-surface overlap between said first and second members of at least about 19 mm, preferably 20 mm, and up to about 40 mm. Overlaps towards the larger end of this range are particularly applicable where the first member extends substantially to the end of the paper insulation of the cable, or substantially to the beginning of its tapering down towards the conductor, when such profiling is present; this being the case when electrical connection is made to the connector by means, for example crimping that is not harmful to a nearby polymeric member. When electrical connection is made by soldering, for example, in order to avoid heat damage it is desirable to space the first polymeric member relatively further axially away from the conductor, thereby leading to an overlap of a size towards the smaller end of the abovementioned range.

Preferably, the sealant material is arranged to overlap the first polymeric member at said edge adjacent the cable conductor by between about 15 mm and 25 mm after the second polymeric member has been recovered thereover. In a method in which the second polymeric member is recovered over the said third polymeric member and further sealant material is provided at the edge between the first and third members, the said further sealant material preferably extends for between about 10 mm and 20 mm along the first member from said edge, thereby to enhance the containment of the impregnating material of the paper insulated cable.

The second polymeric member may comprise semi-conductive or conductive material by consisting of a homogeneous member or by being the inner member of a two-part member. In particular, the second member may comprise a two-part member whose inner part comprises semi-conductive material and whose outer part comprises insulating material.

The sealant material may be applied integrally with one of said first and second polymeric members.

A further one or more recoverable polymeric members may be recovered over said second member.

One or more, and preferably all, of the polymeric members may be of generally tubular configuration, and where the second member is a two-part member this may be formed as a co-extrusion, or by moulding. Furthermore, one or more, and preferably all, of the polymeric members may be cross-linked, and preferably heat-recoverable, members, made, for example, from polyolefin material.

The sealant material may be an adhesive or a mastic, but advantageously it comprises an oil-resistant mastic, and preferably has a viscosity at 25° C. (room temperature) of between $2 \times 10^5$ and $1 \times 10^6$ Pa-sec.(dynamic viscosity) and at 70° C. (typical maximum operating temperature of the cable) of between $1 \times 10^4$ and $2 \times 10^5$ Pa-sec.

In accordance with another aspect of the present invention, there is provided a method of sealing a joint between a first cable comprising a mass-impregnated paper insulated cable and a second cable comprising a plastic insulated cable, wherein an end of said first cable is stripped to expose a conductor thereof and to expose a length of the overlying mass impregnated paper insulation, and wherein a first recoverable polymeric member that is substantially unaffected by the mass-impregnating material is recovered on to the impregnated paper insulation to leave exposed a portion thereof adjacent the bared conductor of the first cable, oil-resistant sealant material is applied to enclose completely said exposed insulation and to overlap the adjacent first polymeric member and bared conductor, and a second recoverable polymeric member is recovered so as to extend over said sealant material and to be in direct contact with said first polymeric member.

Preferably, the direct contact between said first and second polymeric members extends axially of the first cable for a length of between about 20 and 40 mm.

Preferably the first polymeric member is overlapped by the sealant material for between about 15 mm and 25 mm.

The second polymeric member may be electrically semiconducting or conducting, this being particularly advantageous at voltages above about 1 kV, say between 12 and 17.5 kV, to effect stress-control.

Preferably, the second polymeric member extends from the first cable across the joint between the conductors of the first and second cables, and on to the insulation of the second cable.

The sealant material may advantageously extend from the first cable across the joint between the conductors of the first and second cables, and over any exposed portion of the conductor of the second cable.

The sealant material and polymeric members are preferably as described above with reference to said one aspect of the invention.

Advantageously, the oil-resistant first polymeric member is of a material sold under the trade name KYNAR, but Viton fluorocarbon rubber, silicone rubber, and nylon compositions, amongst others, are possible suitable alterations. During operation of the cable, the oil becomes heated thus generating a pressure within the cable. In general, the above-mentioned alterations have poorer pressure retention qualities than KYNAR, the important characteristic in this context is the stiffness of the polymeric member, and this can be achieved, for example, by selecting a tubing with wall thickness of about 0.5 mm and a Secant Modulus of about 600 Mega Pascals, or a wall thickness of about 2 mm having a Secant Modulus of about 150 Mega Pascals. Such tubing has a stiffness such that it does not flex under oil pressure normally generated in operation.

In accordance with a further aspect of the invention, there is provided a method of breaking out the cores of a multi-core, for example three core, cable used for connecting said cores to respective ones of a plurality of single core cables, in which a breakout is applied over the end of the multi-core cable, the cores are jointed together, a plurality of recoverable protective components are recovered around respective ones of the jointed cores and to overlap with respective end portions of the breakout, and a further recoverable protective component is recovered so as sealingly to encompass said overlaps between the breakout and said plurality of components, the entire breakout, and an adjacent portion of said single core cables.

It will be appreciated that sealed cables, transition joints, and break-out arrangements produced by the methods set out above are within the scope of the present invention.

A transition joint between a three-core mass-impregnated paper insulated cable and a plastic insulated cable, suitable for use in the voltage range 12 to 17.5 kV, will now be described, by way of example to illustrate the present invention, with reference to the accompanying drawings, in which:

FIG. 2 is a side elevation, partly in section, of a breakout arrangement for the cores of the three-core paper cable.

FIG. 1 shows a joint between one core, generally shown at 2, of a three-core mass-impregnated paper insulated cable and one core, shown generally at 4, of a plastic insulated cable having three substantially identical single cores.

Figure 1:
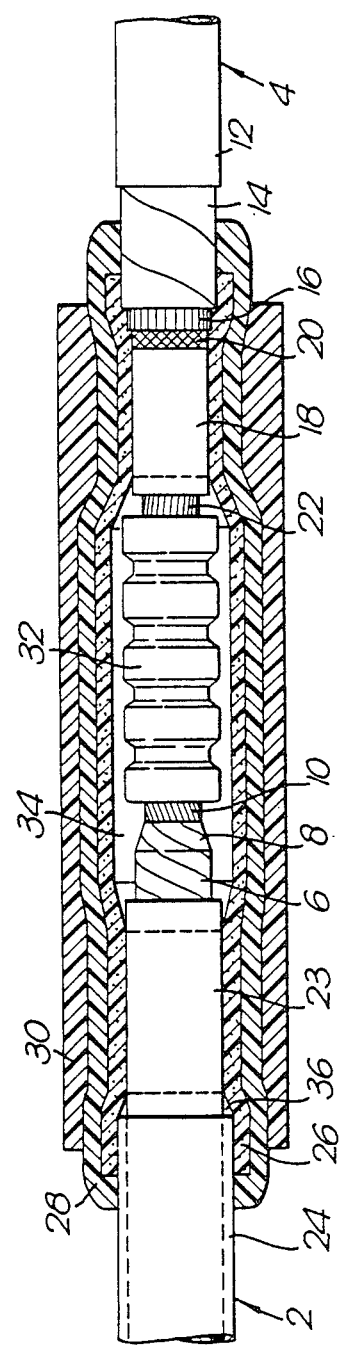
FIG. 1 is a side elevation, partly in section, of one of the cores of the joint.

The paper cable core 2 is stripped back to expose the impregnated insulating paper 6 that is chamfered at 8 down to an exposed conductor 10 at one end thereof. In a corresponding manner, the plastic cable core 4 is successively stripped back from its oversheath 12 to expose a length of its metal tape shield 14, semi-conductive tape screen 16, plastic insulation 18, which has conducting paint 20 applied thereto adjacent the semiconductive screen 16, and conductor 22.

Since the mass-impregnating compound of the paper cable has a typical viscosity value at room temperature of about 10,000 mm$^2$/sec, this would tend to flow out of the cable after it has been stripped back so as to expose the paper 6 and before completion of the joint. In this case, it may be advantageous to apply an oil-resistant tape to extend between the exposed conductor 10 over the chamfer 8 and along the exposed length of the paper 6, thereby to provide a barrier that is temporarily-effective against oil drainage from the cable. Such taping may be avoided, however, if the following step in the process of jointing the cables is carried out sufficiently soon after stripping of the paper cable. A heat-recoverable polymeric tube 23 of electrically insulating material that is resistant to the mass-impregnating material of the core 2 is recovered over the papers 6 from the position along the cable where they are first cut back to an axial position slightly displaced from the larger diameter of the chamfered portion 8 on the opposite side thereof to the conductor 10 to act as a barrier tube. Tubing sold under the Trade Name KYNAR has been found particularly suitable for this purpose. Where the above-mentioned oil-resistant tape has not been applied over the whole length of the exposed paper 6, it may still be found advantageous to enclose that portion of the papers that would be left exposed after recovery of the barrier tube 23.

Heat recoverable polyolefin tubings 24, 26, 28 and 30, for purposes hereinafter defined, are now slid in their unrecovered cylindrical states over the plastic cable core 4 away from the joint area. The cable conductors 10 and 22 are introduced into respective ends of a metal ferrule 32, and this is crimped so as to effect electrical connection between the cable conductors.

Oil-resistant mastic 34 is then applied around the ferrule 32, over any remaining exposed portions of the conductors 10 and 22, over the paper 6 of the paper core 2 and so as to provide an overlap on to the oil barrier tube 23 and on to the plastic insulation 18 of the respective cables. The mastic 34 is applied over the above-mentioned areas to seal in the mass-impregnating material of the cable core 2, and to give a smooth exterior surface.

The recoverable tube 24, made of a conductive polymeric material sold under the Raychem Trade Name CNTM, is then slid across the joint, over the oil barrier tube 23, and is recovered thereonto at an axial position spaced from the mastic 34. A further portion 36 of oil-resistant mastic is applied around the end of the tube 24 at its overlap with tube 23.

The recoverable tube 26, which is stress-controlling and sold under the Raychem Trade Name SCTM, is then positioned across the cable joint such that it extends over the conductive tubing 24 on the core 2 and over the metal shield 14 on the core 4. The tube 26 is then heated to effect its recovery. Upon recovery of the tubing 26 over the oil-resistant mastic 34 and 36, the mastic, having a viscosity at 25° C. of between $2 \times 10^5$ and $1 \times 10^6$ Pa-sec, will become radially compressed and flow axially to a certain extent. The amount of mastic 34 and 36 applied is arranged to be such that on recovery of the tubing 26, there are overlaps of about 15 mm and 10 mm, respectively on the oil barrier tube 23. Furthermore, the oil barrier tube 23, conductive tube 24, and stress control tube 26 are arranged such that the direct polymer-to-polymer overlap between the tubes 23 and 26 is at least about 20+/−5 mm and at most about 40 mm. As shown in the figure, this latter overlap is towards its maximum range, thus disposing the free end of the barrier tube 23 closely adjacent the chamfered paper portion 8. However, where the electrical interconnection of the conductors 10 and 22 is made by means such as soldering, whereby the heat applied could adversely affect the closely adjacent oil barrier tube 23, it is desirable that the oil barrier tube be terminated further away from the chamfer 8, thus reducing the amount of overlap to a value towards the lower end of the range given above.

The overlaps referred to above have been found to provide very good retention of the oil of the cable 2. This is so because flowable sealing is obtained where the tube 24 overlaps the tube 23 and where the tube 23 overlaps the paper 6, so that any surface imperfections or other discontinuities in the overlapping surfaces are filled in, and also because the intermediate portion of direct polymer-to-polymer contact avoids the possibility of cohesive failure that would exist if the mastic were to extend completely along the overlap between the tubes 23 and 26.

It will thus be appreciated that the enclosing of the mass-impregnated insulating papers 6 by the oil barrier tube 23 and oil-resistant mastic 34 seals in the mass-impregnating compound such that other components, in this case the conductive tube 24 and the stress control tube 26, which are adversely affected by the compound, may be safely applied to the joint.

Finally, the tubing 28, made of insulating polymeric material is brought over the joint and recovered and similarly the tubing 30 which provides electrical screening.

Although as described above the tubings 26, 28 and 30 are provided as discrete items, it is envisaged that the functions carried out thereby may be effected by a reduced number of tubings, as set out, for example, in U.K. Patent No. 2,042,818, where co-extrusions are disclosed. Furthermore, it is envisaged that the sealant material, as exemplified by the mastic 34, 36, may be provided integrally with one of the polymeric members, for example by being provided as an internal coating on the second polymeric member, exemplified by the tubing 26.

The viscosity of the mastic 34, 36 is selected so that it is sufficiently fluid at its application temperature to ensure good sealing against cable oil around the ends of the tubes 22 and 24, and yet such that at the normal operating temperature, of about 70° C., of the cable, its viscosity, generally between $1 \times 10^4$ and $2 \times 10^5$ Pa-sec, is such that it maintains sealing against outward pressure of the oil within the cable. In this respect it is noted that pressure can arise in an MI cable either as a static head pressure resulting from installation of the cable in undulating areas, or from terminal boxes mounted high on transmission line poles, or as pressure arising due to thermal expansion of the compound in the cable during heating cycles in operation. Furthermore, it will be noted that sealing against the oil is effected both by the oil-resistant mastic and also by the direct polymer-to-polymer sealing along the oil barrier tube 23.

Figure 1A:
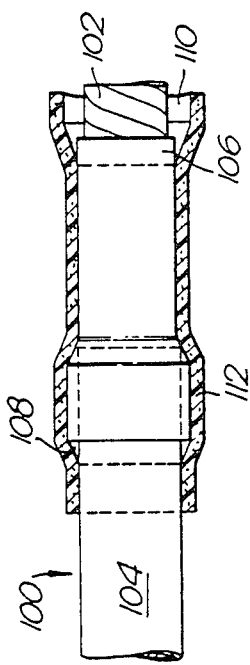
FIG. 1A is a partial section through part of a modified joint.

Referring to FIG. 1A, part of a cable core 100 is shown of a single core 24 kV MI cable, which is of a modified construction from the core 2 of FIG. 1. For convenience, only part of the joint is shown where it differs from the joint shown in FIG. 1. In this arrangement, the conductive tubing 24 of the cable core 2 is not required.

The core 100 is stripped back to reveal a portion of the insulating impregnated paper 102, and a portion of the lead or aluminium sheath 104. Recoverable oil barrier tubing 106, for example of the same material as tubing 23, is recovered to extend over the paper 102 and sheath 104, the preferred latter overlap being between about 40 mm and 60 mm. Oil resistant mastic 108 and 110, for example of the same material as the mastic 34, is applied at the ends of the tubing 106, and recoverable stresscontrol tubing 112, for example of the same material as the tubing 26, is recovered to overlap the sheath 104, encompass the sealant material 108 and tubing 106 and to extend over the sealant material 110 and on across the joint.

The amount of mastic 108 applied is preferably such that, after recovery of the tubing 112, it extends axially along the sheath 104 for between about 10 mm and 20 mm. Furthermore, the direct polymer-to-polymer axial overlap between the stress-control tubing 112 and the oil barrier tubing 106 is preferably between about 19 mm and 40 mm as described with reference to FIG. 1, but may be increased by up to about 30 mm.

The remainder of the joint is constructed as described above with reference to FIG. 1.

Referring to FIG. 2, there is shown a break-out and joint arrangement for connecting the cores of a three-core cable 40 to respective ones of three identical single cores 42.

The oversheath 44 of the cable 40 is stripped back to reveal a portion 46 of the steel armour of the cable. A plumb 48 is formed at the end of the armour 46 and three flat metallic braids 50 (only two of which are shown) extend therefrom to provide earth continuity to respective ones of the armour 52 of the cores 42. A heatrecoverable three-outlet electrically-conductive break-out 54 is recovered over the end of the cable 40 so as to arrange the three cores 56 projecting separately therefrom. The three cores 56 are electrically connected to the three cores 42 in any convenient manner, depending upon the type and voltage rating of the cable 40 and cores 42.

A tinned copper mesh screen 58 is provided around each of the three joints and is electrically connected at one end to the plumb 48 on the cable 40 and at the other end to the armouring 52 of each of the cable cores 42. A semiconductive heat-recoverable polymeric tubing 60 is then recovered around respective ones of the joints and arranged to overlap at the cable 40 end, respective outlets 62 (only two of which are shown) of the break-out 54, and, at the other end, respective ones of the PVC sheaths 64 of the cable cores 42. The tubings 60 provide further protection over the joint regions of the three cable cores. Finally, a further heat-recoverable polymeric tube 66, sold under the Raychem Trade Name XCSM, is recovered so as to extend from an overlap with the oversheath 44 of the able 40, over the armour 46, the plum 48, the conductive break-out 54, and to overlap the adjacent ends of each of the three tubings 60. To assist in the sealing of the tube 66 on to the tubing 60 in the region of the break-out outlets 62, mastic sealant material 68 is disposed around the outlets in the regions of the ends of the tubings 60, and, in particular, in the crutch 70 therebetween.

The break-out arrangement thus provided, in particular whereby the cores of a multi-core cable are separated and sealed, by the break-out, to provide three individual cores that are then separately jointed, requires the use of only one break-out component. The arrangement thus not only simplifies assembly, but also allows the jointed cores to be separated, thereby to improve heat dissipation inuse.

I claim:

1. A method of sealing an end of a mass-impregnated paper insulated cable, the cable sheath being stripped from the end of the cable to expose a length of the mass-impregnated paper insulation and to expose a conductor of the cable, said method comprising:
   (a) positioning a first dimensionally recoverable polymeric sleeve such that it overlies the end region of the cable sheath, the adjacent portion of the mass impregnated paper insulation and the adjacent portion of the conductor;
   (b) causing the first olymeric sleeve to recover so that it encloses the end region of the cable sheath and the adjacent portion of the insulation;
   (c) removing a portion of the first polymeric sleeve to leave the end region of the insualtion unenclosed;
   (d) applying a sealant material over the unenclosed insulation and the adjacent and region of the first polymeric sleeve;

(e) positioning a second dimensionally recoverable polymeric sleeve such that it overlies the sealant material and the adjacent region of the first polymeric sleeve beyond the applied sealant material; and (f) causing the second polymeric sleeve to recover so that it encloses the sealant material and the adjacent region of the first polymeric sleeve;

said first polymeric member and said sealant material being substantially unaffected by the mass impregnating material of the cable.

2. A method according to claim 1, wherein the axial length of the overlap between the first and second polymeric members is between about 19 mm and 40 mm.

3. A method according to claim 1 or 2, wherein the overlap between the sealant material and the first polymeric member is between about 15 mm and 25 mm axially of the cable.

4. A method according to claim 1, wherein the second polymeric member is made of semi-conductive or conductive material.

5. A method according to claim 1, wherein a third recoverable polymeric member is recovered over the cable to overlap said first first member and is sealed thereto.

6. A method according to claim 5, wherein sealant material applied to effect said sealing between the first and third members is arranged to overlap the first member by between about 10 mm and 20 mm axially of the cable.

7. A method according to claim 1, in which the sealant material has a viscosity at 25° C. of between about $1 \times 10^6$ and $2 \times 10^5$ Pa-sec.

8. A method according to claim 1, wherein the sealant material is an oil-resistant mastic.

9. A method according to claim 1, wherein said insulation is contained within a cable sheath, and wherein said first polymeric member is recovered over a portion of said sheath adjacent said exposed paper insualtion and is sealed thereto.

10. A method according to claim 9, wherein sealant material applied to effect said sealing between the first polymeric member and the sheath is arranged to overlap the sheat by between about 10 mm and 20 mm axially thereof.

11. A method according to claim 9, wherein said first polymeric member overlaps the sheath by between about 40 mm and 60 mm axially thereof.

12. A method according to claim 9, wherein the first polymeric member overlaps said paper insulation by between about 19 mm and 40 mm axially thereof.

13. A method according to claim 1, wherein said sealant material is applied integrally with one of said first and second polymeric members.

14. A method of sealing a joint between a first cable comprising a mass-impregnated paper insulated cable and a second cable comprising a plastic insulated cable, the sheath of each of said cables being stripped from the end thereof to expose a length of the cable insulation and to expose a conductor thereof, the conductors of said cables being electrically connected, said method comprising:

(a) positioning a first dimensionally recoverable polymeric sleeve such that it overlies the end region of the cable sheath of the mass-impregnated paper insulated cable, the adjacent portion for the exposed mass-impreganated paper insualtion and the adjacent portion of the conductor;

(b) causing the first polymeric sleeve to recover so that it encloses the end region of the cable sheath and the adjacent portion of the insualtion;

(c) removing a portion of the first polymeric sleeve to leave the end region of the insualtion unenclosed;

(d) applying sealant material over the unenclosed insulation, the adjacent end region of the first polymer sleeve and the conductors;

(e) positioning a second heat recoverable sleeve such that it overlies the sealant material, the adjacent region of the first polymeric sleeve beyond the applied sealant material and at least a portion of the plastic insulation of said second cable; and (f) causing the second polymeric sleeve to recover so that it encloses the sealant material, the adjacent region of the first polymeric sleeve and at least a portion of the plastic insulation of said second cable;

said first polymeric member and said sealant material being substantially unaffected by the mass impregnating material of the cable.

* * * * *

UNITED STATES PATENT AND TRADEMARK OFFICE
CERTIFICATE OF CORRECTION

PATENT NO. : 4,755,241

DATED : July 5, 1988

INVENTOR(S) : Norman R. Steinberg

It is certified that error appears in the above-identified patent and that said Letters Patent is hereby corrected as shown below:

Col. 1, line 32, after "cable,", insert -- say 65 to 70°C. It is known that oil can rapidly cause --.

Col. 8, line 49, delete "inuse", and insert -- in use --.

Col. 8, line 61, after "first" correct olymeric to read -- polymeric --.

Col. 8, line 65, correct the spelling of "insulation".

Col. 9, line 24, delete the second occurrence of "first".

Col. 9, line 39, correct the spelling of "insulation".

Col. 10, lines 22, 26 and 28, correct the spelling of "insulation".

Col. 10, line 29, after "applying" insert -- a --.

Col. 8, line 67 after "adjacent" please delete "and" and insert -- end --.

UNITED STATES PATENT AND TRADEMARK OFFICE
CERTIFICATE OF CORRECTION

PATENT NO. : 4,755,241

DATED : July 5, 1988

INVENTOR(S) : Norman R. Steinberg

It is certified that error appears in the above-identified patent and that said Letters Patent is hereby corrected as shown below:

Col. 9, line 44, delete "sheat" and insert -- sheath --.

Signed and Sealed this

Seventh Day of February, 1989

Attest:

DONALD J. QUIGG

*Attesting Officer*   *Commissioner of Patents and Trademarks*